Dec. 14, 1971   V. FÄHNRICH   3,627,494
AUTOMATIC ANALYZER

Filed Dec. 30, 1968   3 Sheets-Sheet 1

INVENTOR
VLADIMIR FÄHNRICH
BY
ATTORNEY

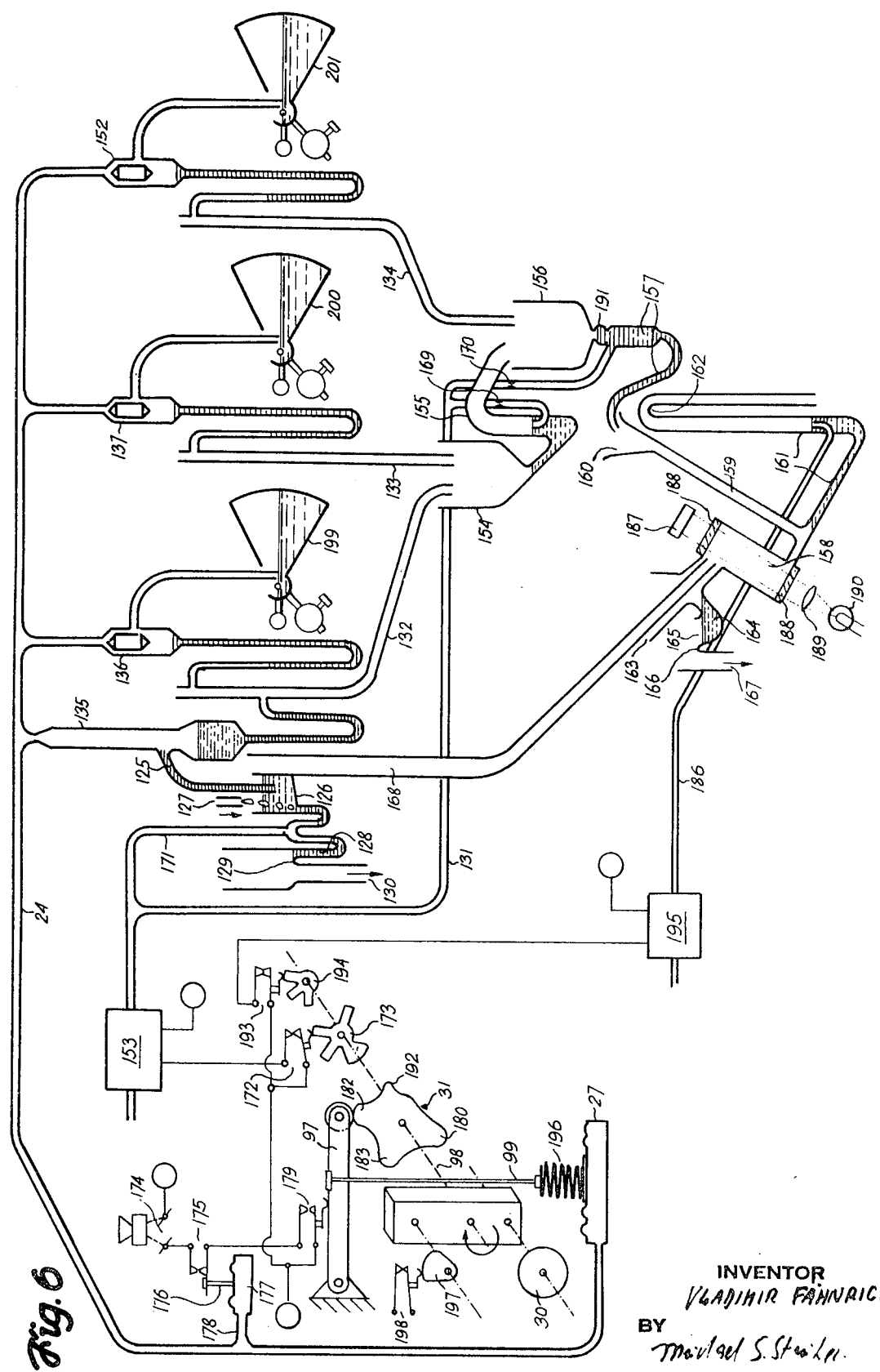

United States Patent Office 3,627,494
Patented Dec. 14, 1971

3,627,494
AUTOMATIC ANALYZER
Vladimir Fähnrich, Prague, Czechoslovakia, assignor to CKD Dukla, Narodni Podnik, Prague, Czechoslovakia
Filed Dec. 19, 1968, Ser. No. 785,276
Claims priority, application Czechoslovakia, Dec. 20, 1967, 9,015/67; May 4, 1968, 3,276/68; May 17, 1968, 3,611/68; May 31, 1968, 4,011/68; Aug. 20, 1968, 6,018/68
Int. Cl. G01n *1/14, 21/00*
U.S. Cl. 23—259
16 Claims

ABSTRACT OF THE DISCLOSURE

All arrangement for the automatic manipulation of reagent solutions through the application of pneumatic signals. The arrangement is equipped with photometric apparatus, dosing apparatus, fluid lifting devices, and pneumatic overflow pipettes. A pneumatic signalling arrangement applies pneumatic techniques for carrying out the analyzing of fluids through measurements, transfer procedures, mixing and flow-off steps. These analytical processes are carried out without the application of valves or closure elements, and the operational handling of the fluids in the form of sample fluid and reagent solutions are automatically carried out for photometric analysis.

BACKGROUND OF THE INVENTION

The present invention resides in an apparatus for the automatic manipulation of reagent solutions through direct operating pneumatic signals. In the technical development of analyzers, the manipulation of reagent solutions implies the measuring, transfer, mixing and flow-off of fluids. The initial developmental stages were directed towards these areas, and for this purpose different types of closure elements were developed. Among these were electrically actuated squeezing valves, electromagnetic solenoid valves, and pneumatically controlled membrane valves. Efforts were aimed at obtaining reliable operation with miniature equipment, and to provide for the application of substantially corrosive solutions. Through the use of these closure members, it was possible to realize the desired characteristics through a system with unique properties. These apparatuses, however, are relatively complicated, costly, and are not free from disturbing effects in operation. Independent of this, apparatus were constructed which operate continuously and perform, through small pumps a series of analytical treatments and processes, as required in processes for automated analysis. Hoses used in conjunction with small or miniature pumps produce difficulties, since the materials used lose after a period of time, their elastic properties, and thereby influence reliability of operation of the apparatus.

In contrast to the conventional apparatus in which the preceding disadvantages reside, the present invention is an automatic analyzer in which no closure members or valves and no small or minitaure pumps are used. Instead, pneumatic signals are applied, and the natural or inherent properties of the fluids being processed, are utilized.

The arrangement of the present invention provides for different elements for carrying out different manipulations with fluids. Through their interconnections and different combinations, the desired operational characteristics are realized. Thus, various operations with the sample and the reagent solutions may be carried out. Such reagent solutions are necessary for carrying out, in an automatic manner, the photometric analysis and the changing of the filling of the photometric container with the sample to be processed. This applies to the reagent solutions and the sample itself. The apparatus of the present invention sets itself with regard to its sensitivity in relation to its zero position, as required in modern types of analyzers.

The automatic analyzer consists of the photometric apparatus, the manipulation unit and the dosing apparatus. A fluid lifting arrangement is, moreover, combined with a pneumatic system of overflow pipettes. The fluid lifting arrangement consists of a container, and a U-shaped flow-off pipe connecting to the bottom of the container, by way of a connecting channel. The U-shaped flow-off pipe consists of a downward directed arm and an upward directed arm. The latter terminates below the level of the container bottom with an overflow. In the connecting portion immediately below the container bottom, an air admitting line is connected to the downward directed arm of the flow-off pipe. This air admission line is directed upward. In this case, the connecting channel is straight-lined and has a small clear width. The connecting channel can also be loop-shaped, so that an upper bend of the loop forms the connecting portion and lies above the level of the overflow. The air admission pipe enters at this upper bend of the loop. The lower bend lies below the overflow, on the other hand. The automatic analyzer is equipped with apparatus for automatically evacuating on the basis of pneumatic means using air pressure. For this purpose, a double bend flow-off pipe connects to the bottom of the photometric container or to the container of the photometer. In the drop-off portion, it is inclined and leads to the upward directed portion. It also enters the upper bend of the drop-off line which has a vent. The drop-off line enters or communicates with the removal line, and a narrow air entering line enters with an upward directed end in the rising portion. This lies above the lower bend and at a level below the lowest point of a bottom of a photometer container. Photoelectric cells in the form of photoelectric resistances are used as compensating elements in the circuit of a photometer. The photoelectric resistance measuring cell is illuminated by a light source between the cell and the photometric container. The resistance measuring cell is, furthermore, connected to an attenuating potentiometer through a bridge circuit, and is connected to the measuring apparatus. The bridge consists of a compensating potentiometer, a resistor and photoelectric compensation cell which is directly illuminated by a light source. The two potentiometers are arranged so that for increasing illuminating intensity directed against the photometric resistance measuring cell, the energizing voltage becomes correspondingly decreased. This decrease in the energizing voltage is caused by the variation of the potential decrease across the photoelectric resistance compensation cell. The constant level of the reagent solutions for the pipetes are maintained through float containers, and the overflow sample flows through an overflow pipeline in the float container. In this manner, overflow of the sample level is maintained constant. The float containers are arranged with the reagent solutions for the individual pipettes so that they may float freely within an enclosure. The constant level of the reagent solutions can also be achieved through tipping containers rotatable about the horizontal axis. As the weight of the container becomes balanced through a fixedly connected counterweight, so that the center of gravity of the system including the balanced container, lies along the horizontal axis. This balanced system also includes the carrying or mounting arm for a further weight. The mounting arm is oriented in relation to the container so that the container is at its maximum tipped angle when the center of gravity is below the axis. The container is of the form whereby the moment resulting from the fluid mass within the container is always counterbalanced for all filling stages of the container.

The apparatus of the present invention has one advantage based on the simplicity of the individual operational members and elements, due to the specifically selected principles of operation, and in addition the present invention also has the advantage from the viewpoint of operating reliability. It is not difficult to produce the devices and elements of the present invention through stamping procedures using plastics or similar synthetic materials. As a result, the apparatus of the present invention may be used with considerable economy and lower cost, compared to the conventional devices.

SUMMARY OF THE INVENTION

An automatic analyzer with a photometric apparatus, dosing apparatus and signalling and control unit. A fluid lifting arrangement is combined with a system of pneumatic overflow pipettes for producing automatic manipulation of reagent solutions. The fluid lifting arrangement is in the form of a mixing container having a base communicating with a U-shaped flow-off line, by way of a connecting channel. The U-shaped flow-off line has a downward directed arm and an upward directed arm, with the latter terminating in an overflow which lies below the level of the bottom or base of the mixing container. An air admitting pipeline directed upward, is introduced into the downward directed arm, immediately below the bottom of the mixing container. The connecting channel is straight-lined and has a small clear width.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 6 is a functional operational diagram and shows an automatic pneumatically controlled photometric analyzer with tipping containers for reagent solutions, in accordance with the present invention.

DESCRIPTION OF THE PREFERRED EMBODIMENTS

Figure 1:
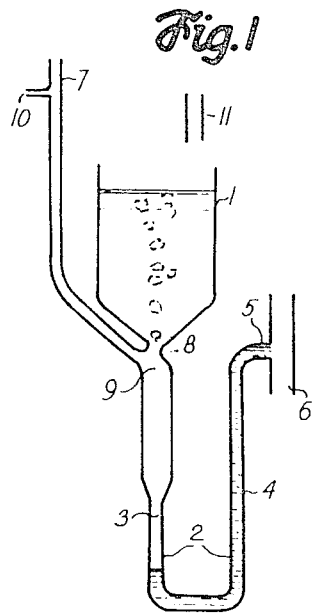
FIG. 1 is a functional operational diagram of a fluid lifting arrangement, in accordance with the present invention.

Referring to the drawing, FIG. 1 shows a fluid lifting arrangement in which a mixing container or enclosure 1 has a conical base from which an exit tube 2 leads. This exit tube consists of a downward-directed arm 3 and an upward or rising arm 4, so that a U-shape is realized. The arm 4 communicates with an overflow 5 which is located at the end of the rising arm 4 and immediately below the level of the base of the enclosure 1. The overflow 5 empties into the overflow tube 6. A vent 7 is connected to the upper portion of the arm 3, at a location directly below the base of the mixing enclosure 1. The vent 7 is connected to a pressurized air source as, for example, an air pump or a motor driven bellows. The arm 3 has an expanded diameter directly below the location at which the vent 7 enters the arm 3. This expanded portion 9 of the arm 3 communicates, at its upper end, with the enclosure 1 through a narrow connecting channel 8. The length of the expanded portion 9 is equal to the height of the fluid column within the mixing enclosure 1 when the latter is completely filled with reagent solution. The air vent tube 7 can be of narrow cross section in the space above the mixing enclosure 1, and can in fact be a capillary tube 10 which communicates with the atmosphere. A sampling tube 11 resides above the mixing enclosure 1, and passes the fluids which are to be mixed within the enclosure.

The aforementioned arrangement operates on a periodic basis. The exit tube 2 is filled with fluid beforehand, so that it forms a fluid closure. If fluid is transmitted into the enclosure 1 from the sampling tube 11, while at the same time air does not pass through the air vent 7, the fluid flows through the fluid closure of the exit tube 2 without accumulating within the mixing enclosure. When, however, air is transmitted through the air vent 7, the air must pass through the connecting channel 8 as a result of the resistance of the fluid closure, and exit flow of the fluid is thereby prevented. As a result, the fluid collects or accumulates within the mixing container 1. If after the passage of air through the air vent 7 while the mixing container 1 was empty, a number of reagents were dosed therein, and the container 1 was able to accept or receive these reagents, and air cushion results within the downward portion of the arm 3 and in the connecting portion 9. This occurs precisely as shown in FIG. 1, and the rising air bubbles within the mixing container 1 cause a complete intermixing of the solutions or reagents. When the air admitted through the air vent 7 is interrupted or discontinued, the air exits either through the capillary 10 or through the air pump, and the fluid flows out of the mixing container 1 through the exit tube 2 and into the overflow tube 6.

Figure 2:
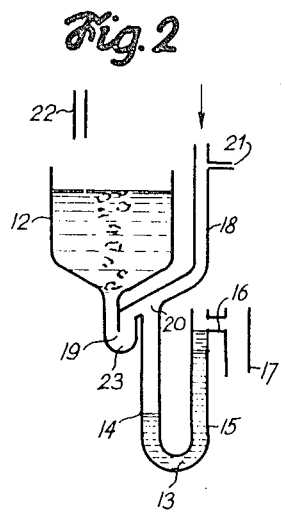
FIG. 2 is a functional diagram of the apparatus of FIG. 1 in which the connecting channel of the apparatus is loop-shaped.

In order to achieve a reliable function, the connecting channel 8 must be narrow in relationship to the forced-through air, for otherwise the fluid could also escape when air is admitted. Even with wide tube opening and with light air application so that rapid flow out of the mixing container 1 is possible, the function may be reliable provided the apparatus is designed in accordance with FIG. 2. Instead of the straight-lined connecting channel 8, a loop-shape channel is here provided in the form of channel 19. Otherwise, the apparatus is designed identically with the preceding one with the mixing container 12, the exit or flow-off tube 13 with downward directed arm 14 and upward directed arm 15, the overflow 16, the overflow tube 17, the air admission tube 18, the capillary 21 and the sampling tube 22. The lower knee 23 of the loop of the connecting channel 19, lies below the level of the overflow 16. The upper knee of the loop forms the connecting portion 20 communicating with the air admitting tube 18 from above. The arrangement operates precisely as that of FIG. 1 with the exception that reliable operation is realized also with small quantities of air and with large width of the loop-shaped connecting channel 19.

Figure 3:
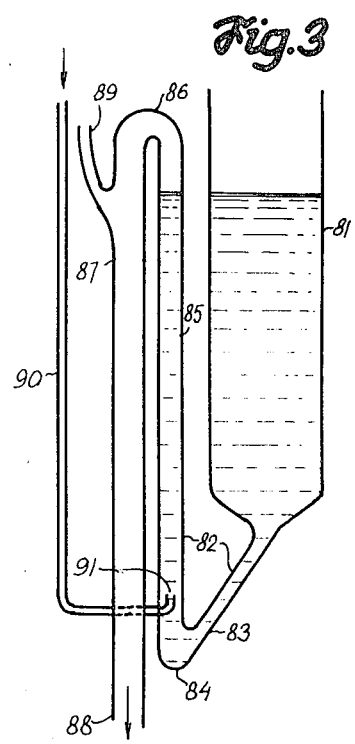
FIG. 3 is a functional diagram and shows the arrangement for automatic evacuation of containers.

FIG. 3 shows an arrangement which may be combined with pneumatic operating dosing members or elements, and which has provision for automatically emptying the container by means of air pressure. The container 81 which is to be emptied, is designed with a conically-shaped base which connects with a doubly-bent emptying all evacuation tube 82. The downward directed portion 83 of this evacuating tube 82 is inclined and terminates in a lower bent 84. The rising portion 85 begins at this bent 84 and terminates at the upper bent 86 which lies at exactly or or above the level of the highest permissible fluid level within the container 81. The upper bent 86 passes into a drop line or drop tube 87 which is provided with a bent 89, and has a lower opening 88. A narrow tube 90 with a right-angle bent 91 is introduced into the portion 85 of the evacuation tube 82. The end 91 must lie lower than the bottom of the container 81, so that all of the fluid may flow out of the container, through gravity, and into the space of the upward directed portion 85. The clear width of the rising portion 85 must correspond to the upper surface tension of the fluid. The optimum clear width corresponds to the diameter of the largest fluid drop which can exist without spatial interference, for a given temperature. For water, it is desirable to select a diameter of 3.5 to 6 millimeters for the rising portion 85. The drop-off tube 87 must have sufficient clear width so that no fluid column can exist therein. This condition corresponds to a clear width exceeding 6 millimeters for water. If the diameter of the drop-off tube 87 is so large that no fluid column can remain hanging therein, a vent 89 becomes unnecessary. It is possible that the drop-off tube 87 can operate as the downward arm of a siphon when filling the container 81. Under such condition only, is it necessary to provide the vent 89 when in filling the container 81 fluid overflow results and the fluid level drops below the upper bent 86.

To illustrate the operation of the arrangement, assume that the container 81 is filled with fluid to the extent that through the overflow of the upper bent 86, the container 81 is filled to the corresponding maximum height. In the event that the contents are to be evacuated or emptied, air at substantially low pressure is admitted through the narrow tube 90. The pressure is such that it is sufficient to overcome the fluid column which prevails above the end 91. When this condition has been fulfilled, the air forces the fluid column out of the rising portion 85 and into the drop-off tube 87. In this first instant the lower bent 84 and the dropping portion 83 brakes the air current so that the air does not escape through this path. When the fluid column has been eliminated from the rising portion 85, the fluid commences to flow from the container 81 and toward the end 91. As a result, a mixture of fluid and air prevails in the rising portion 85 which becomes conveyed out by the air as more fluid arrives. The end 91 of the narrow tube 90 does not function in this case as an ejector. In order to achieve such functional operation, the air pressure must be considerably higher. The fact which demonstrates that no injector operation prevails, is that the arrangement does not fully empty the container 81, in the case that the end 91 lies at the level of the bottom of the container 81 or is above this level. In this emptying or evacuation of the container, in accordance with the present invention, sipping of the fluid is more closely approached, and this is related to the upper surface tension, as already indicated.

Figure 4:
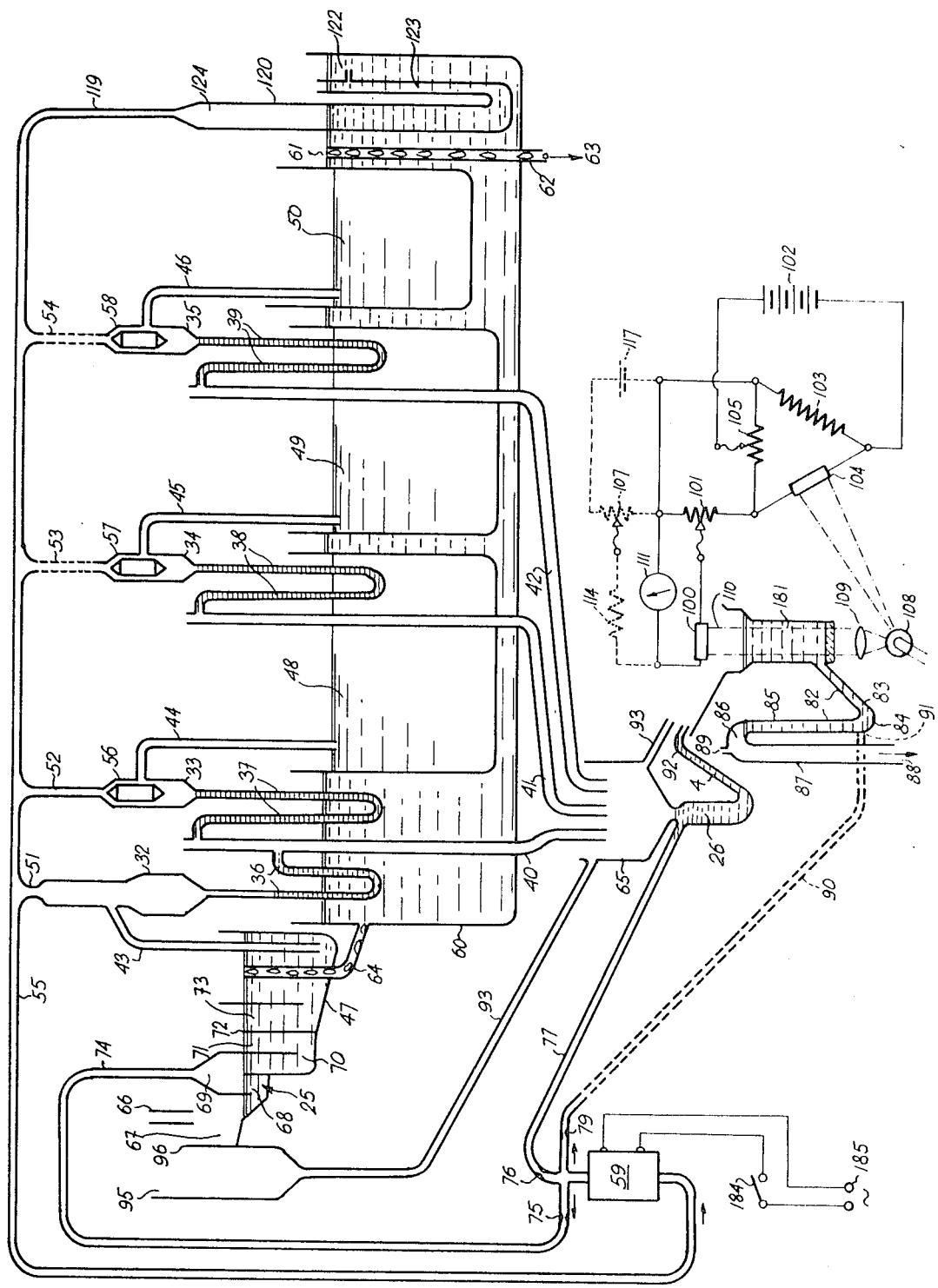
FIG. 4 is a functional operational diagram of an automatic pneumatically controlled photometric analyzer with float containers for reagent solutions.

FIG. 4 shows a possible combintion of a system of pneumatic overflow pipettes with the fluid lifting arrangement 25 and the fluid lifting arrangement 26. The arrangement 25 serves to interrupt or discontinue the fluid oncoming flow, whereas the fluid lifting arrangement 26 serves to mix and measure the reagent solutions. A combination is also with an arrangement for the automatic and pneumatic emptying of the container by means of air pressure. This combination forms a dosing for measuring apparatus of an analyzer for automatically carrying out the photometric analysis of a continuously flowing sample. In this case, the main pipette 32 serves to convey the measured sample. Overflow pipettes form the basis of the apparatus. Whereas the main pipette 32 is for the sample, the pipette 33 and the additional pipettes 34 and 35 are for reagent solutions. The tubes 53 and 54 shown in the drawing by broken lines and corresponding to the pipettes 34 and 35, respectively, must not be installed in the event that only one reagent solution is to be dosed. If two different reagent solutions are to be dosed, the pipette 34 becomes installed next to the pipette 33, and the pipette 35 is omitted. The pipettes are arranged so that at their lower ends they are shaped in the form of U-shaped flow-off tubes, 36, 37, 38 and 39. Fluid closures or valves prevail within these U-shaped flow-off tubes, and the flow-off tubes communicate with removal tubes 40, 41 and 42. Filling tubes 43, 44, 45 and 46 lead into the body sides of the pipettes 32, 33, 34 and 35. One of the filling tubes reaches into the sampling container 47. The filling tubes of the pipettes 33, 34 and 35 lead into the container in which the fluid level is automatically maintained at constant height. This can be achieved as shown in FIG. 4. In this design, float containers 48, 49 and 50 float within the float container 60 into which the sample is continuously passed. The sample flows out of this container through the overflow tube 62 and into the overflow 63. As a result, a constant fluid level is maintained through the overflow 61 within this container. The pipettes 32, 33, 34 and 35 are connected with the accumulating line 55, through the pipelines 51, 52, 53 and 54. The measuring members receive the necessary pneumatic vacuum pressure through this accumulating line 55. The sample measuring container 47 measures the sample which flows therethrough, and is provided with an overflow tube 64. The overflow tube 64 communicates with the float container 60 which has the fluid lifting arrangement 25 situated before it. This fluid lifting arrangement interrupts the sample flow to the sample measuring container 47, and the continuously flowing sample is thereby conducted through the pipe 66 and into the chamber 67 which exhibits the same portion as the container 12 in FIG. 2. The fluid lifting arrangement 25 consists of a loop-shaped channel 68 which communicates with the connecting portion 69 of the air admitting tube or line 74 of the fluid lifting arrangement 25. The latter, furthermore, has the U-shaped flow-off channel 70 in which the rising arm 71 is separated from the dropping arm 73 through an overflow separating wall 72. The arm 73 is associated with the sampling container 47 into which the sample flows from below. The chamber 67 is separated from the container or enclosure 95 through the separating wall 96. A pipeline 93 passes out from below the container 95. The pipeline 93 exits or communicates into the funnel portion of the photometer 181. A bent evacuating line 82 leads out of the photometer 181, at the lower end. This evacuating line 82 has a dropping portion 83, a lower bent 84 and a rising portion 85. This rising portion terminates at the top, in an overflow bent 86 which passes into the drop-off line 87. The latter terminates in a fall-off or drop-off opening 88. The preceding photometer container 181 can operate as a flow-through type of photometer container. It is also possible to install a pneumatic evacuation system of FIG. 3. In such an arrangement the lower portion of the rising member 85 of the evacuation line 82 has a narrow tube 90 connected to it, and the lower end 91 of this narrow tube 90 is curved upwards. The photometer container 181 has a ray of light 110 transmitted through it from the light source 108 and the lens 109. This ray of light impinges upon the photoelectric cell 100. Sample and reagent solutions become intermixed in the mixing chamber 65 into which the pipelines 40, 41 and 42 enter. The pressurized air actuated fluid lifting arrangement 26 is connected to this mixing chamber 65. The air becomes supplied through the lead line 77, and the flow-off line of the mixing chamber 65 communicates together with the pipeline 93 in the funnel-shaped opening of the photometric container 181. The lead line 77 is connected to the pressure line of the air pump 59, through the narrow portion 76. The pipeline 74 of the fluid lifting arrangement 25 is connected to this narrow portion 76, by way of the narrow portion 75. In a similar manner, the narrow portion 79 of the pipeline 90 also communicates with the narrow portion 76. The accumulating line 55 is connected to the suction side of the air pump 59. The electrical drive of the air pump 59 becomes connected to the power line 185 at predetermined intervals, through the action of the switch 184. Each one of such connection to the power line, corresponds to the measuring of a dose. The vacuum reducer 120 is connected to the accumulating line 55, through the pipeline 119. This vacuum pressure reducer 120 has a U-shaped tube with an open arm 123 provided with a small opening 122. In addition, this reducer has the closed arm 124 which connects with the pipeline 119. The vacuum pressure reducer 120 resides in the float container 60, and the measurements are selected so that the small opening 122 lies below the fluid level in the float container 60. At the same time, however, the open arm 123 terminates with its opening above the fluid level. The apparatus for the photometric measurement can be provided with a compensating arrangement, as illustrated in FIG. 4. The photoelectric resistance measuring cell 100 feeds the measuring apparatus 111 with a signal voltage attenuated by the potentiometer 101 serving as a voltage divider. This attenuating potentiometer 101 is energized from a voltage source 102, by way of a bridge which has a compensating potentiometer 105 in one of its branches. The second branch of this bridge includes the resistor 103, whereas the third branch has the photoelectric compensating cell 104. This cell 104 is directly illuminated with light from the light source 108. In the case that the zero indication of the measuring instrument 111 is to correspond to maximum light transmissibility, a difference voltage is used. This difference voltage is applied to the measuring instrument 111 through the large resistor 114 of the potentiometer 107. This potentiometer 107 is energized from a separate voltage source 117.

In the operation of this automatic pneumatically controlled photometric analyzer of FIG. 4, assume that the individual parts of the measuring apparatus have been filled, as illustrated in the diagram of FIG. 4. Thus, the U-shaped flow-off lines 37, 38, and 39 are filled with the individual reagent solutions. The sampling measuring container 47 and the float container 60, however, are provided with the sample. The flow-off line of the fluid lifting arrangement 26 and the photometric container 181 are filled with colored sample fluid. When the air pump 59 becomes operated through actuation of the switch 184, a vacuum pressure prevails within the accumulating line 55, as a result of the suction action of the air pump 59. The pressure action of the air pump 59 causes an air current or air stream in the fluid lifting arrangements 25 and 26, as well as in the evacuation apparatus of a photometric container 181. As a result of this condition, the latter becomes evacuated. The narrowed-down portions 75, 76 and 74 in the respective pipelines are chosen so that the air current is distributed in a predetermined manner into the individual members. The air passing through the fluid lifting arrangement 25, in the form of air bubbles, interrupts the sampling flow into the sampling measuring container 47. As a result, the sample accumulates within the chamber 67. In view of the vacuum pressure, the fluids become sucked through the filling tubes 44, 45 and 46, and flow into the pipette bodies. The fluid closures or valves in the U-shaped flow-off lines 37, 38 and 39 operate in the form of check valves. In the main pipette 32, the measured sample begins to flow into the sample measuring container 47, in accordance with the same principle. The vacuum perssure reducer 120 assures that the air pump 59 does not cause too large a vacuum within the accumulating line 55, so that air could penetrate the fluid closures or valves. The fluid flows, thereby, out of the open arm 123 and into the closed arm 124. At the same time, the air bubbles pass through the open arm 123 so that the vacuum pressure within the accumulating line 55 cannot be larger than the water column in the closed arm 124. The sample can drip out of the float chamber 60 and into the open arm 122, by way of the small opening 122. This is based on the assumption that the sample quantity pushing into the vacuum pressure reducer 120 is only very minute during the operation of the air pump 59, so that the level or the height of the sample is not influenced. At the instant when the last amount of sample flows out of the sample measuring container 47, all pipettes are filled with reagent solutions up to the entrances of the filling tubes 44, 45 and 46. When the last amount of fluid has passed out of the main pipette 32, atmospheric air is passed in through the filling tube or line 43. It is assumed here that the contact space of the sampling measuring container 47 with the dropping arm 73 is smaller than the contact space of the body of the main pipette 32. The air current streaming through the filling line 43 removes the vacuum pressure within the accumulating line 55, as well as the measured reagent solutions. The sample flows thereby through the fluid closures or valves of the U-shaped flow-off lines 36, 37, 38 and 39, and into the removal lines 40, 41 and 42. The overflowing reagents solutions which were sucked into the pipette body during the first phase, flow back into the float containers 48, 49 and 50. The volume measured by the pipettes is determined through the magnitude of the pipette bodies below the entrance of the filling lines 44, 45 and 46. These volumes may be varied by varying the height of the filling bodies 56, 57 and 58 through sliding in or sliding out. These filling members or bodies diminish the cross-sectional area of the pipette bodies at the entrance height of the filling tube, and improve the reproducibility of the measuring process. The pipettes are then evacuated or emptied up the height of the fluid closures or valves. Various reagent solutions become combined within the mixing chamber 65 within which the fluid lifting arrangement 26 is penetrated by the air. This penetrating air prevents the flow of the fluid mixture, so that the rising air bubbles intermix well the reagent solutions. The photometric container or enclosure 181 becomes evacuated in the event that an evacuating arrangement is installed. The duration in which the switch 184 is in the on position or circuit closure position, is chosen so that the sample accumulated within the chamber 67 does not begin to flow over the separating wall 96. At that instant of time, the switch 184 becomes interrupted and the reagent solution flows out of the mixing chamber 65 and into the photometric container 181, for the purpose of becoming photometrically evacuated. The previously sucked-in sample flows out of the vacuum pressure reducer 120 and finally back into the float container 60, through the small opening therein. In a similar manner, the accumulated sample within the chamber 67 flows into the sample measuring container 47 which becomes further filled through the bypassing sample. In the event that a non-colored sample is introduced into the photometer 181 for actual measurement, so that the automatic auxiliary apparatus (not shown) carries out the zero setting of a photometer, then the air pump 59 is allowed to operate or run for a longer period of time. The pump is thus operated until the sample flows over the separating wall 96 in the container 95, and passes from there into the photometer container 181 where it replaces the old reagent solution to a pure or fresh probe. It is asusmed here that the photometer container 181 functions as a flow-through container, and is not installed as an automatic evacuator.

Figure 5:
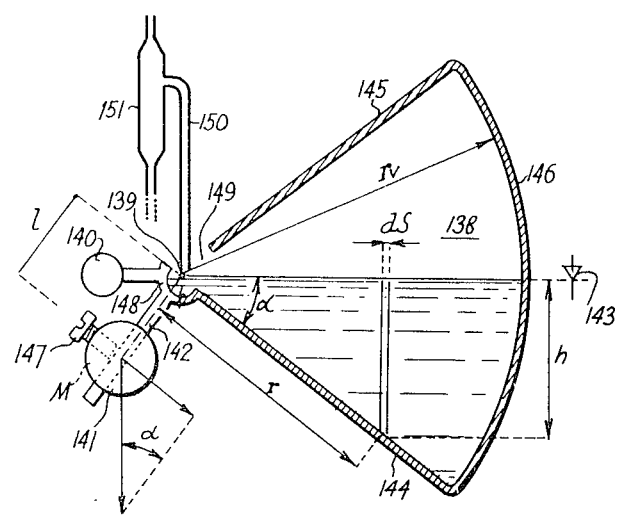
FIG. 5 is a functional diagram of a tipping container which assures constant fluid height.

In the operation of the compensation circuit of FIG. 4, the effects of the intensity decreases of the light source 108 are principally taken into account through variation of the energizing voltage for the photometric resistance measuring cell 100. These variations of the energizing voltage are produced in the opposite sense of an illuminating variation, and the arrangement is such that the two effects, compensate each other. The inversion of the energizing voltage for the attenuating potentiometer 101 which provides the energizing voltage for the protoelectric resistance measuring cell 100, is achieved by applying the stabilizing voltage of the source 102 to the attenuating potentiometer 101, by means of a bridge. One branch of this bridge includes the directly illuminated photoelectric compensating source 104. If the voltage source 102 is sufficiently large for the photoelectric resistance measuring cell 100, from the viewpoint of the desired magniutde thereof, the compensating potentiometer 105 can be set so that the compensation can be made complete. The setting is such that the light intensity of the light source 108 is suddenly varied, as well as the position of the compensating potentiometer 105. This setting is accomplished with an auxiliary arrangement, and the sudden variation is carried out to the extent that the measuring instrument 111 does not indicate further this variation. When this stage has been attained, the sensitivity of the apparatus becomes set through the attenuating potentiometer 101. If the deflection of the measuring apparatus 111 increases proportionally, then the difference voltage is applied to the measuring apparatus 111, by installing an independent voltage source 117 applied across the potentiometer 107. This difference voltage is applied by way of the large resistor 114, and the polarity of the voltage source 102 is changed. By means of the attenuating potentiometer 101, the magnitude of the difference voltage is varied so that the deflection or indication corresponds to the total reflection coefficient scale. The advantage of this compensating circuit resides in fully paralyzing the effects of the variations or oscillations of light intensity associated with the light source, for every reflection coefficient of the reagent solution. Aside from this aforementioned float system for pneumatic pipettes, the constant level of the reagent solution can also be assured through containers which may be tipped, as shown in FIG. 5. These containers are of advantage in the respect that they do not depend upon the continuous flow of the sample. They can also be used for different apparatuses in laboratories as, for example, in connection with a constant flow height. They are also usable in large industrial apparatuses. In contrast with the Mariotte bottles, they have the advantage that they can be filled with reagent solution during operation, through an opening in the cover. This filling process may take place without the requirement of closing the air space above the fluid. FIG. 5 shows a particular case or situation of a tipping container, in which the container has a cylindrical cross-section. FIG. 5 shows a vertical section of the container on a plane perpendicular to the rotational axis.

The axis of the cylinder which is formed by the section of the container 138, is also the rotational axis 139. The container 138 is, therefore, rotatably mounted into bearings, for example, about the rotational axis 139. The lower sectional surface 144 forms the bottom or base of the container 138, whereas the upper sectional surface 145 forms the cover. The cylindrical surface 146 forms the side wall of the container 138. The two cross-sectional surfaces enclose an angle which is less than 90°. The container 138 is balanced through the fixed counterweight 140. The counterweight 140 is of such magnitude that the center of gravity of the empty container and the counterweight 140, lies in the horizontal rotational axis 139. The empty container 138 remains in that position, in which it was brought without incurring any rotation of its own. The mounting arm 142 also belongs to the balanced part, and is fixedly connected to the system. This arm is arranged perpendicular to the rotational axis 139 and to the lower sectional surface 144. The weight 141 is movable on the mounting arm or carrying arm 142. By means of a screw 147, the weight 141 may be fixed in place. It is assumed here that the center of gravity of the weight 141 lies in the axis of the mounting arm or carrying arm 142. The weight 141 is either spaced from the rotational axis 139 or made of the magnitude so that it can balance the fluid within the container 138, if the latter has been filled to the level of the rotational axis 139 corresponding to the standard level 143. The requirement for fulfilling this condition can be easily evaluated.

Thus, the weight 141 must be displaced so that the resulting torque or moment about the rotational axis 139 is equal to the moment resulting from the fluid within the container 138. This condition must apply for each filling of a container. The swinging of the container 138 about the angle $\alpha$, as a result of the moment caused by the fluid, can be expressed as the sum of the hydrostatic pressure applied to the lower surface 144. The hydraulic pressure acting against the cylindrical surface 146 need not be taken into account, since it is radially directed and does not produce any moment. This pressure becomes taken into account or compensated through the mounting of the rotational axis. The moment caused by the fluid is designated as $D_K$, and the largest height of the fluid column is designated by the thickness $ds-h$. For other designations, the radius of the operating fluid column on the lower sectional surface 144 is $r$, the acceleration is $g$, the radius of the cylindrical section is $r_v$, the fluid density $\rho$, and the height of the cylinder section is $v$.

From the symbols, the following relationship is realized:

$$D_K = \rho \cdot g \int_0^{r_v} r \cdot h \cdot ds$$

$h$ can be replaced through the product $r \cdot \sin \alpha$, and $ds$ can be replaced through $v \cdot dr$. Then $$D_K = \rho \cdot g \cdot V \cdot \sin \alpha \int_0^{r_v} r^2 \cdot dr = \rho \cdot g \cdot v \cdot \sin \alpha \frac{r_v^3}{3}$$

The moment $D_Z$ due to the mass M of the weight 141, at the distance $l$ from the rotational axis 139 has the magnitude $$D_z = M \cdot g \cdot l \cdot \sin \alpha$$

In the event that the functional requirement of the system is to be fulfilled, the two moments must be equal and therefore, $$D_Z = D_K$$

from which $$M \cdot g \cdot l \cdot \sin \alpha = \rho \cdot g \cdot v \cdot \sin \alpha \cdot \frac{r_v^3}{3}$$

and $$M \cdot 1 = \rho \cdot v \cdot \frac{r^3}{3}$$

It may seen from this that the product $N.l$ of the preceding equation is not dependent upon the angle $\alpha$ of the swinging or deflection. It is thus seen that in this arrangement the requirement for maintaining precisely the fluid level at the standard level 143, may be fulfilled.

In a practical arrangement it is necessary to provide a recess in the vicinity of the rotational axis 139 at the lower sectional surface 144. A slot 149 is cut into the cover so that the take-off line 150 of a pneumatic overflow pipette 151 may be passed therethrough.

Figure 7:
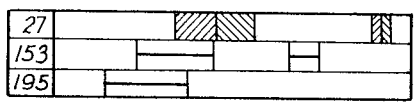
FIGS. 7 and 8 are timing diagrams and show the timing of processes into preselected variations of photometric analyzers.

FIG. 6 shows an alternate concept of the present invention, in which the pneumatic signals for the measuring members and elements are realized independently through means of a bellows. This bollows forms a portion of the central signal member which cooperates with electrical signals in addition to the pneumatic signals. This concept of the apparatus serves chemical plants and for two-sided filling of the photometer container. The pneumatic circuit to which the sample pipette 135 and the pipettes 136, 137, and 152 for the reagent solution are connected, is controlled through the bellows 27. The latter becomes influenced through the pressure spring 196, and in addition by the cam 31 through the linking rod 99 operating in conjunction with the follower arm 97. The cam 31 has a main tooth or projection 180, a miniature projection 192, and two additional small teeth or projections 182 and 183. Cams 173 and 194, furthermore, are mounted on the same driving shaft 98 which drives the cam 31. The driving shaft 98 is driven through a motor and the driving mechanism 30. The cams 173 and 194 actuate the switches 172 and 193, respectively. The motor with its drive 30 also actuates the cam 197 which operates the switch 198. The mechanism actuating the bellows 27 closes the switching contacts 179 at maximum suction. The terminals 174 of the signal arrangement are connected to one phase of the switching contacts 179. An interrupter switching contact 175 is connected between the terminals 174 and the contacts 179. The contacts 175 become interrupted through the actuating rod 176 and the miniature bellows 177 which are connected to the pipeline 178. Tipping containers 199, 200, and 201 serve as the storage containers for the reagent solution which are dosed through the pipettes 136, 137, and 152. The sample pipette 135 has a shorter filling tube 125 than that shown in FIG. 4, relative to the remaining pipettes. The filling tube 125 projects here into the container 126 into which the sample flows continuously through the pipe 127. The fluid arrangement 128 is connected to the container 126. The overflow 129 of the arrangement 128 communicates with the drop-off 130. The container 126 is also provided with an overflow pipe 168. The U-shaped flow-off lines of the pipettes 135 and 136 communicate with the removal line 132. The latter and also the removal line 133 of the pipette 137 communicates with the container 154 which is provided with a pneumatic automatic evacuation apparatus 155. The flow from this apparatus 155 is led to a further mixing container 156 into which also the pipeline 134 of the pipette 152 is conducted. The mixing container 156 has a conically-shaped base communicating with the chamber 191 which connects with the fluid lifting arrangement 157. The latter enters into the funnel portion 160 out of which the filling tube 159 leads fluids to the photometer 158. The latter has glass windows 188 and is subjected to light rays from a light source 190. Through the presence of the lens 189, this light ray is directed so that it passes through the axis of the photometer 158, and impinges upon the photoelectric cell 187. A filling cup 163 leads from the top of the photometer container 158. The filling cup 163 is connected with the chamber 165 at the level just above the upper glass window 188. This connection is made through the channel 164. The chamber 165 communicates with the overflow 166, and from there with the drop-off 167. The apparatus 161 for automatically evacuating on a pneumatic basis, connects to the filling tube 159 from below. This apparatus 161 has an overflow 162. The air pressure for the individual pneumatically operated elements is applied through the primary and secondary air pump 153 and 195. The dividing of the air pressure of the primary air pump 153 is accomplished through the distribution pipeline 131, and through the narrowed-down portion 171 leading to the fluid lifting arrangement 128. The air pressure of the primary air pump is further distributed through the narrowed-down portion 169 and lead to the apparatus 155 for automatic and pneumatic evacuation. Finally, distribution of this air pressure is also made through the narrowed-down portion 170 leading to the fluid lifting arrangement 157. A primary pump is actuated by the switch 172. The secondary air pump 195 is turned on through the switch 193, and is connected, through air line 186, to the apparatus 161 for automatic and pneumatic evacuation of the photometer 158. In the operation of the arrangement of FIG. 6, it is assumed again that all fluid closures are filled beforehand with fluid, and that these flow through the pipeline 127 and reach the drop-off 130. It is assumed further that this is accomplished without filling the container 126 so that the filling tube 125 connects the entire pneumatic pipeline 24 with the external atmosphere. For taking a measurement, the secondary air pump 195 is first set into operation. The primary air pump 153 becomes then actuated as illustrated in FIG. 7. As a result, the photometer 158 becomes evacuated and the fluid lifting arrangement 128 lifts the fluid level within the container 126 above the end of the filling tube 125. The bellows then begins to suck so that several pipettes become filled with fluid. The suction of the bellows 27 is illustrated in the diagram of FIG. 7 by cross-hatched lines directed towards the right. The oppositely directed cross-hatching represents the evacuation of the bellows 27. The overflowing sample begins simultaneously to flow out of the container 126, by way of the overflow line 168. In the event that the secondary air pump 195 ceases to operate, the photometer 158 becomes filled with a pure or fresh sample. At the instant when the bellows 27 is at maximum suction, the primary air pump 153 is turned off. The measured fluids flow from the pipettes 135, 136, 137 and into the container 154 in which the reaction takes place in accordance with the analytical requirements. The reagent solution out of the pipette 152 flows into the mixing container 156 where it remains in the chamber 191. After that, the air pump 153 becomes again turned on for a short period of time, as shown in FIG. 7. As a result, the reagent solutions at the end of the reaction flow out of the container 154 and into the mixing enclosure 156. By means flow of the air out of the fluid lifting arrangement 157, the previously measured reagent solutions of the third pipette 152 is added to the mixture from the chamber 191. The latter takes place within the mixing chamber or container 156. The reagent solutions become intermixed, and after the primary air pump 153 is stopped, these reagents flow through the fluid closures of the fluid lifting arrangement 157, and into the funnel 160. In this case it is assumed that this mixture of reagent solutions has a larger specific gravity than the sample itself. In a given arrangement of the photometer, the reagent solution forces the sample out of the photometer container 158. The sample thereby flows through the narrow channel 164 and into the drop-off 167. It is assumed here that the drop-off of the solution out of the mixing container 156 becomes braked to the extent that the fluid level in the photometer 158 does not exceed the level of the overflow 162. With larger differences in specific gravity between the reagent solutions, a sharply defined separating plane appears between the reagent solution and the sample during filling. As a result, the sample is substantially and completely forced out with light reagent solution overflow. The advantage of an arrangement in which the photometer 158 is not emptied through the apparatus 161 before being filled with colored reagent solution, resides in the condition that the reagent solutions can be changed within the photometer container without resulting in any changes from the viewpoint of the associated air bubbles. It is assumed here that when filling the photometer with a pale sample, the photometric apparatus is automatically set to zero through a special apparatus, not shown, actuated by a signal from the switch 198. If, now, the colored reagent solution is introduced into the photometer container through the substitution method described, the reflection coefficient for the remaining tracts may be determined with greater reproducibility and precision. This may be applied, for example, to silicon dioxide. The miniature projection or tooth 192 produces a relatively weak breathing of the bellows 27, when the primary air pump 153 is stopped. This corresponds to an empty container 126. This process has the purpose to retain a drop clinging in the filling tube 125. This drop becomes expelled when the bellows 27 forces air out from within it.

The apparatus is provided with an arrangement for signalling any disturbing condition that may rise. For maximum suction of the bellows 27 during operation of the main pipeline 180, a predetermined vacuum pressure must prevail when the following conditions prevail: The entire pneumatic pipeline 24 is densely filled, the fluid closures are correctly filled, the tipping containers 199, 200 and 201 have sufficient reagent solutions and the sample through the pipeline 127 flows in sufficient quantity, so that the sample pipette 135 is continuously filled in sufficient quantity. The effect of the vacuum pressure is transmitted to the interrupting switching contacts 175, through the miniaturized bellows 177 and the connecting rod or link 176. These interrupting switching contacts 175 interrupt the current circuit. Provided that all conditions are fulfilled, the switching contacts 179 which are closed at maximum suction, do not apply any signal to the terminals 174 upon the opening of the interrupting switching contacts 175. In the opposite case, the arrangement provides an alerting signal.

Figure 8:
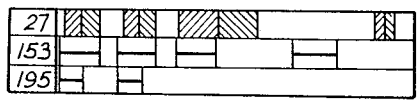

In conjunction with the process described above for changing the filling with colored and uncolored samples, a still further embodiment can be selected in an alternate manner. In such a situation, different programs of the individual operational members are applied as shown in FIG. 8. In this case the overflow line 168 enters the drop-off. The cam 31 is provided with smaller teeth 182 and 183. Similarly, cams 173 and 174 remain to be provided with teeth. As may be seen from the diagram in FIG. 8, a two-fold filling of the sample pipette 135 first results without simultaneously filling the remaining pipettes. Through means of the secondary air pump 195, the photometer 158 becomes evacuated, and the fluid lifting arrangement 128 becomes replaced in operation, through the primary air pump 153. In the following suction of the bellows 127, only the sample pipette 135 becomes filled as a result of the light suction capacity. A vacuum pressure is developed such that overflow into the pipettes 136, 137, and 152 is not possible. In the following expelling action of the bellows, the sample flows thereby into the container 154 only from the pipette 135. The sample is immediately conducted on through the apparatus 155 for automatically producing evacuation of the mixing container 156 by way of pneumatic means. When the primary air pump 153 ceases to operate, the sample flows into the empty photometer 158. This process is repeated, and only then is the actual measurement carried out by the apparatus, as shown in FIG. 7. The rinsing by the sample can be carried out often. The photometer 158 is also filled with pure or fresh sample, so that the zero setting can take place before the actual measurement. The process decribed above for rinsing the apparatus with the sample has, however, a still further advantage. Thus, the fluid closures of some pneumatic members can be filled beforehand with fresh sample fluid. It is then possible to change different combinations of samples for individual measurements, without affecting the measurement of a subsequent sample through combination of any previous sample. This is of particular advantage when the analyzer is to be combined with an arrangement for the automatic switching or changing of samples. This situation applies in which the apparatus is to be used for analyzing a number of samples at successively occurring and periodic intervals.

The other apparatuses as described, can, for example, be used for automatic analysis in controlling water synthesis.

It will be understood that each of the elements described above, or two or more together, may also find a useful application in other types of constructions differing from the types described above.

While the invention has been illustrated and described as embodied in automatic analyzers, it is not intended to be limited to the details shown, since various modifications and structural changes may be made without departing in any way from the spirit of the present invention.

What is claimed as new and desired to be protected by Letters Patent is set forth in the appended claims:

1. An automatic analyzer for analyzing a predetermined mixture of a sample fluid and at least one reagent fluid, said analyzer comprising, in combination, photometric means; means for supplying said predetermined mixture to said photometric means; a sample fluid container and at least one reagent fluid container; pipette means comprising a sample fluid pipette and at least one reagent fluid pipette respectively communicating with said sample fluid container and said reagent fluid container; flow-off pipeline means providing communication between said pipettes and said means for supplying said predetermined mixture to said photometric means; means for applying suction impulses to said pipettes for respectively sucking fluid from said containers into said pipettes; fluid seal means in said flow-off pipeline means for maintaining under pressure in said pipettes during application of suction impulses thereto; and fluid controlled means cooperating with said sample fluid container for terminating said suction impulses and for connecting the interior of said pipettes to the outer atmosphere so that fluid sucked thereinto during said suction impulses is discharged through said flow-off pipeline means and said fluid seal means into said supplying means and from there into said photometric means.

2. The automatic analyzer as defined in claim 1, wherein each of said pipettes has an upper end communicating with said suction pulse applying means and a lower end to which the respective flow-off pipeline means is connected, each of said flow-off pipeline means including an upright U-shaped portion adapted to be filled with liquid and constituting said fluid seal means for maintaining under pressure in the pipette during application of a suction impulse thereto, said pipettes respectively communicating with said containers through filling pipeline means connected to the respective pipette intermediate the ends thereof.

3. The automatic analyzer as defined in claim 1 including accumulating line means for applying suction impulses to said pipette means; air pump means connected at its suction side to said accumulating line means; vacuum pressure reducing means connected to said accumulating line means and being of U-shaped pipeline means, said vacuum pressure reducing means having an open arm through a substantially small opening; and float container means with fluid level maintained constant by said vacuum pressure reducing means.

4. The automatic analyzer as defined in claim 1 including automatic evacuating means connected to said photometric means comprising container means; a double bend evacuating pipeline means connected to said container means and having a downward directed section leading from said container means and having an upward directed section connected between the two bends of said evacuating pipeline means; flow-off pipeline means connected to said upward directed arm through one bend of said evacuating pipeline means; and air admitting means connected to said upward directed arm and lying below the level of the fluid within said container means while being above the lower bend of said two bends connected by said upward directed arm.

5. The automatic analyzer as defined in claim 1 including periodic automatic zero setting means of said photometric means comprising a container in said photometric means; overflow means communicating with said container; pipeline means for collecting overflow fluid from sample fluid directed into said container; and separating means for maintaining separate said container from said fluid lifting means, said container being filled with non-colored sample fluid prior to zero setting of said photometric means.

6. The automatic analyzer as defined in claim 1, said reagent fluid container comprising tippable container means tippable about a horizontal axis for maintaining the level of fluids constant in said analyzer; counterweight means for balancing said tippable container means and arranged so that the center of gravity of the balanced system lies in said horizontal axis; adjustable weight means adjustably secured to said balanced system; mounting arm means for supporting said adjustable weight means and oriented so that the center of gravity of said adjustable weight means lies below said horizontal axis when said tippable container means is tipped at maximum deflection.

7. The automatic analyzer as defined in claim 1, wherein said fluid controlled means for terminating said suction impulses comprise fluid lifting means upstream of said sample fluid container and communicating therewith.

8. The automatic analyzer as defined in claim 7, wherein said means for supplying said predetermined mixture to said photometric means comprises a mixing chamber with which said flow-off pipeline means communicate, said at least one reagent container comprising at least one float container means and means cooperating therewith for maintaining the level of fluid in said float container means at a constant elevation; and including accumulating line means providing communication between the upper ends of the pipette means and said suction pulse applying means, and filling pipeline means respectively providing communication between said sample fluid container and said sample fluid pipette and said float container means and said at least one reagent fluid pipette.

9. The automatic analyzer as defined in claim 7 and including feed line means for feeding a sample fluid to be analyzed, said fluid lifting means comprising chamber means below said feed line means and being continuously supplied through the latter with sample fluid;

flow-off channel means having a downwardly directed arm and a rising arm communicating at its upper end with said sample fluid container; loop shaped channel means interconnecting said chamber means and said flow-off channel means; said suction impulse applying means comprising air pump means having a suction side and a pressure side; and air pressure pipeline means connected to said pressure side of said air pump means for transmitting air under pressure to said loop shaped channel means and to said downwardly directed arm of said flow-off channel means.

10. The automatic analyzer as defined in claim 7 wherein said fluid lifting means comprises mixing container means; connecting channel means connected to the bottom of said mixing container means; U-shaped flow-off line means communicating with said connecting channel means and having an upward directed arm and a downward directed arm; overflow means into which said upward directed arm terminates, said overflow means lying below the level of the bottom of said container; air admitting line means connected to said downward directed arm below the base of said mixing container means for admitting air thereinto, said connecting channel means being straight-lined and having a substantially small clear width.

11. The automatic analyzer as defined in claim 10 wherein said interconnecting channel means is loop-shaped having an upper bend communicating with said air admission line means, said loop-shaped connecting channel means having also a lower bend below the level of said overflow means.

12. The automatic analyzer as defined in claim 1, said fluid lifting means communicating with the bottom of said fluid sample container means; overflow means communicating with said fluid lifting means; bellows means connected to said pipette means; and driving means for controllably driving said bellows means.

13. The automatic analyzer as defined in claim 12 including alarm means for providing an alarm signal when disturbing conditions prevail affecting the operation of said analyzer; control means actuated by said bellows means and driving means for transmitting an actuating signal to said alarm means.

14. The automatic analyzer as defined in claim 1 including funnel means at the base of said photometric means, said photometric means being inclined and filled from two sides; filling means for filling said funnel means, said funnel means communicating with said mixing means, said evacuating means acting on said photometric means, said evacuating means having an overflow means lying above the upper end of said photometric means, whereby said analyzer is adapted for alternately filling with colored and non-colored sample fluid, said sample fluid being applied with reagent solutions and having a combined specific gravity greater than the specific gravity of the sample fluid itself.

15. The automatic analyzer as defined in claim 14 including air pump means connected to said container means, said evacuating means and said fluid lifting means; drive means for controllably driving said air pump means; cam means for controlling said drive means of said air pump means; and switching means actuated by said cam means and said bellows means for following the bellows action of said bellows means, said switching means being opened and closed in response to movement of said bellows means.

16. The automatic analyzer as defined in claim 15 wherein said pipette means comprises a plurality of individual pipettes, said cam means actuating said bellows means so that one pipette is being filled while the remaining pipettes are unfilled, whereby said analyzer is adapted to rinse the measuring apparatus of said analyzer with fresh sample fluid prior to each measurement taken.

References Cited
UNITED STATES PATENTS

| | | | |
|---|---|---|---|
| 2,976,761 | 3/1961 | Whitehead et al. | 23—253 |
| 3,259,462 | 7/1966 | Anscherlik | 23—253 X |
| 3,414,238 | 12/1968 | Catanzaro | 23—253 X |
| 3,422,271 | 1/1969 | Fuhrmann | 23—253 X |
| 3,192,968 | 7/1965 | Baruch et al. | 23—259 X |
| 3,192,969 | 7/1965 | Baruch et al. | 23—259 X |
| 3,193,359 | 7/1965 | Baruch et al. | 23—259 |
| 3,348,921 | 10/1967 | Katz et al. | 23—259 |

MORRIS O. WOLK, Primary Examiner

R. E. SERWIN, Assistant Examiner

U.S. Cl. X.R.

23—253 R; 73—425.6; 250—218